US012624125B2

(12) United States Patent
Ciesielski et al.

(10) Patent No.: US 12,624,125 B2
(45) Date of Patent: May 12, 2026

(54) PHOSPHORUS-CONTAINING CELLULOSE ESTERS, METHODS FOR THEIR PREPARATION, THEIR USE, AND FLAME RETARDANTS

(71) Applicant: FRAUNHOFER-GESELLSCHAFT ZUR FÖRDERUNG DER ANGEWANDTEN FORSCHUNG E.V., Munich (DE)

(72) Inventors: Michael Ciesielski, Darmstadt (DE); Elias Chalwatzis, Darmstadt (DE); Robin Nezami, Darmstadt (DE); Benedikt Sperlich, Darmstadt (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 1051 days.

(21) Appl. No.: 17/640,872

(22) PCT Filed: Sep. 11, 2020

(86) PCT No.: PCT/EP2020/075448
§ 371 (c)(1),
(2) Date: Mar. 7, 2022

(87) PCT Pub. No.: WO2021/048335
PCT Pub. Date: Mar. 18, 2021

(65) Prior Publication Data

US 2022/0332852 A1 Oct. 20, 2022

(30) Foreign Application Priority Data

Sep. 11, 2019 (DE) ..................... 10 2019 213 793.8

(51) Int. Cl.
*C08B 3/14* (2006.01)
*C08B 3/00* (2006.01)
(Continued)

(52) U.S. Cl.
CPC .................. *C08B 3/14* (2013.01); *C08B 5/00* (2013.01); *C08L 1/10* (2013.01); *C08L 1/16* (2013.01); *C09K 21/12* (2013.01); *C08L 2201/02* (2013.01)

(58) Field of Classification Search
None
See application file for complete search history.

(56) References Cited

U.S. PATENT DOCUMENTS 4,857,239 A 8/1989 Hurtel et al.
8,470,916 B2 6/2013 Glauner et al.
(Continued)

FOREIGN PATENT DOCUMENTS

CN 105 936 681 A 9/2016
CN 104 788 575 B 9/2017
(Continued)

OTHER PUBLICATIONS

CN-109942882-A, Jun. 2019.*
(Continued)

*Primary Examiner* — Joseph D Anthony
(74) *Attorney, Agent, or Firm* — Leydig, Voit & Mayer, Ltd.

(57) ABSTRACT

The invention relates to cellulose esters, the ester groups of which are at least partially containing phosphorus and are based on unsaturated carboxylic acids and reactive phosphorus components, wherein the latter are preferably phosphorus derivatives of sugar alcohols or of tartaric acid derivatives. The invention also relates to methods for preparing novel phosphorus-containing cellulose esters and to their use as flame retardants for plastics.

10 Claims, 10 Drawing Sheets

(51) Int. Cl.

| | |
|---|---|
| ***C08B 5/00*** | (2006.01) |
| ***C08L 1/00*** | (2006.01) |
| ***C08L 1/10*** | (2006.01) |
| ***C08L 1/16*** | (2006.01) |
| ***C09K 21/12*** | (2006.01) |

(56) References Cited

U.S. PATENT DOCUMENTS

| | | | |
|---|---|---|---|
| 9,403,952 | B2 | 8/2016 | Wermter et al. |
| 9,969,670 | B2 | 5/2018 | Ardaud et al. |
| 2010/0181696 | A1 | 7/2010 | Glauner et al. |
| 2015/0368405 | A1 | 12/2015 | Wermter et al. |
| 2016/0257704 | A1 | 9/2016 | Tebbe et al. |
| 2021/0130582 | A1 | 5/2021 | Ciesielski et al. |

FOREIGN PATENT DOCUMENTS

| | | | | |
|---|---|---|---|---|
| CN | 107 686 560 | A | | 2/2018 |
| DE | 3037301 | A1 | | 6/1982 |
| DE | 102013101487 | A | | 8/2014 |
| DE | 102014100563 | A | | 7/2015 |
| EP | 0 231 689 | B1 | | 10/1990 |
| JP | 56085497 | A | * | 7/1981 |
| JP | 56085498 | A | * | 7/1981 |
| WO | WO 2009/109347 | A1 | | 9/2009 |

OTHER PUBLICATIONS

Lapienis et al., "Poly( alkylene Phosphate)s Bearing Tetrahydrofuran Rings (1,4-Anhydroerythritol) in the Main Chain," *Journal of Polymer Science: Part A: Polymer Chemistry* 28: 1743-1762 (1990).

Sonnier et al., "Flame Retardant Biobased Polymers," *Towards Bio-based Flame Retardant Polymers*, SpringerBriefs in Molecular Science, pp. 1-121 (2018).

Yan et al., "Graft Copolymerization of 2-Methacryloyloxyethyl Phosphorylcholine to Cellulose in Homogeneous Media Using Atom Transfer Radical Polymerization for Providing New Hemocompatible Coating Materials," *Journal of Polymer Science Part A: Polymer Chemistry* 46(10): 3306-3313 (2008).

German Patent Office, Office Action in German Patent Application No. 10 2019 213 793.8 (Apr. 17, 2020).

European Patent Office, International Search Report in International Application No. PCT/EP2020/075448 (Nov. 19, 2020).

European Patent Office, Written Opinion in International Application No. PCT/EP2020/075448 (Nov. 19, 2020).

International Bureau of WIPO, International Preliminary Report on Patentability in International Application No. PCT/EP2020/075448 (Mar. 15, 2022).

Korean Intellectual Property Office, Notice of Comment, Korean Patent Application No. 10-2022-7011857 (May 9, 2025).

U.S. Appl. No. 16/488,902, filed Aug. 26, 2019.

China National Intellectual Property Administration, Decision on Rejection in Chinese Patent Application No. 202080063578.5 (Mar. 28, 2024).

Zheng et al., "Study on Preparation and Flame Retardancy of Phosphorous Flame Retardant Cellulose Ester and Its Fiber," *The Proceedings of Forum on Chinese Engineering Science and Technology 2015 (Xiao Shan) and China Textile Engineering Society Chemical Fiber Committee Academic Annual Meeting*, pp. 60-68 (2015).

China National Intellectual Property Administration, First Office Action in Chinese Patent Application No. 202080063578.5 (Nov. 3, 2022).

China National Intellectual Property Administration, Third Office Action in Chinese Patent Application No. 202080063578.5 (Sep. 13, 2023).

China National Intellectual Property Administration, Second Office Action in Chinese Patent Application No. 202080063578.5 (May 11, 2023).

Tsafack et al., "Flame retardancy of cotton textiles by plasma-induced graft-polymerization (PIGP)," *Surface and Coatings Technology* 201(6): 2599-2610 (2006).

* cited by examiner

PHOSPHORUS-CONTAINING CELLULOSE ESTERS, METHODS FOR THEIR PREPARATION, THEIR USE, AND FLAME RETARDANTS

CROSS-REFERENCE TO RELATED APPLICATIONS

This patent application is the U.S. national phase of International Application No. PCT/EP2020/075448, filed on Sep. 11, 2020, which claims the benefit of German Patent Application No. 10 2019 213 793.8, filed Sep. 11, 2019, the disclosures of which are incorporated herein by reference in their entireties for all purposes.

The invention relates to cellulose esters, the ester groups of which contain at least some phosphorus and are based on unsaturated carboxylic acids and reactive phosphorus components, the latter preferably being phosphorus derivatives of sugar alcohols or tartaric acid derivatives. The invention also relates to methods for producing the novel phosphorus-containing cellulose esters and their use as flame retardants for plastics.

Easy flammability or combustibility is a disadvantage of most plastic materials, which disadvantage must be overcome or mitigated for numerous applications with the aid of flame retardants. In addition to mineral additives and polyphosphates, which usually have to be added in considerable quantities and in many cases worsen the material properties, and special flame retardant additives having only limited areas of use, halogen-containing flame retardants are of great importance since they are efficient, inexpensive and effect material parameters less. However, the latter can give rise to health risks, in particular in the event of a fire due to the release of toxic gases, and cause environmental problems, not least when disposing of the plastics that they contain. This applies in particular to combinations of halogen-containing flame retardants having the synergist antimony(III) oxide, which are used on a large scale in engineering plastics and polyolefins.

Flame retardants which do not have these disadvantages and can be produced from renewable raw materials are desirable. Special organophosphorus compounds, which are less of an ecological and health concern, have become important as an alternative to halogen-containing flame retardants. Both the exclusive use of such phosphates, phosphinates and phosphonates as flame retardants is known, as is their use as a component of flame retardant mixtures or synergistic flame retardant systems, for example, in combinations with 1,3,5-triazine compounds or polyphosphates.

When used as flame retardants, macromolecular organophosphorus compounds have the advantage that, compared to corresponding low molecular weight phosphorus compounds, they produce less plasticizer effect, which in many cases is undesirable because of the deterioration in material properties, and show hardly any tendency to migrate out of the material. The use of macromolecular phosphorus compounds as flame retardants for plastics is already known.

WO 2009/109347 A1 describes a linear phosphorus-containing polyester based on itaconic acid and ethylene glycol and is obtained by means of phospha-Michael addition of DOPO to itaconic acid or itaconic acid derivatives and subsequent polycondensation with ethylene glycol. Said polyester softens or melts even at relatively low temperatures, which is disadvantageous when incorporated into plastics.

DE 10 2013 101 487 A1 describes phosphorus-containing thermosets. Said thermosets have a basic polyacrylate structure and are also obtained in a two-stage process. First, a suitable phosphorus component, for example, 9,10-dihydro-9-oxa-10-phosphaphenanthrene-10-oxide (DOPO), is added to polyfunctional acrylates by means of phospha-Michael addition, wherein the stoichiometric ratio is chosen so that on average, more than one free acrylate group remains per molecule. The remaining acrylate functionalities are then converted by means of radical polymerization, leading to crosslinking and the formation of the thermoset. These macromolecular flame retardants are only suitable for special areas of application. The highest possible proportion of bio-based structural components is increasingly desired for phosphorus-containing flame retardants, in addition to macromolecular properties.

One starting material of the phosphorus-containing polyester described in WO 2009/109347 A1, itaconic acid, is bio-based, but the other two are not, so that the proportion of renewable raw materials is relatively low.

Furthermore, phosphorus-containing flame retardants based on cellulose, starch, lignin, oligomeric sugars, castor oil, etc. were synthesized and tested.

In addition, flame retardants were produced in which some of the starting materials, such as pentaerythritol, special phenols or other starting materials, were obtained from renewable raw materials. While the former flame retardants have disadvantages compared to conventional, non-bio-based flame retardants with regard to their thermal stability, material compatibility, etc. and are therefore hardly suitable for high-performance polymers, in the latter, the bio-based proportion is usually only moderate, in particular when the synthetic chemicals required for their production are taken into account.

The following review article provides an overview of current developments in bio-based flame retardants: Sonnier R., Taguet A., Ferry L., Lopez-Cuesta J M. (2018) Flame Retardant Biobased Polymers. In: Towards Bio-based Flame Retardant Polymers. SpringerBriefs in Molecular Science. Springer, Cham (DOI https://doi.org/10.1007/978-3-319-67083-6-1; Online ISBN 978-3-319-67083-6; Print ISBN 978-3-319-67082-9).

This object is achieved by the cellulose derivative described herein, by the production method for the cellulose derivative described herein, by the use of the cellulose derivative described herein, by the flame retardant composition described herein, and by the plastic composition also described herein. Advantageous developments thereof are also described.

This object is achieved by the cellulose derivative described herein, by the production method for the cellulose derivative described herein, by the use of the cellulose derivative described herein, by the flame retardant composition described herein, and by the plastic composition also described herein. Advantageous developments thereof are also described.

DETAILED DESCRIPTION OF ASPECTS OF THE INVENTION

Figure 1:
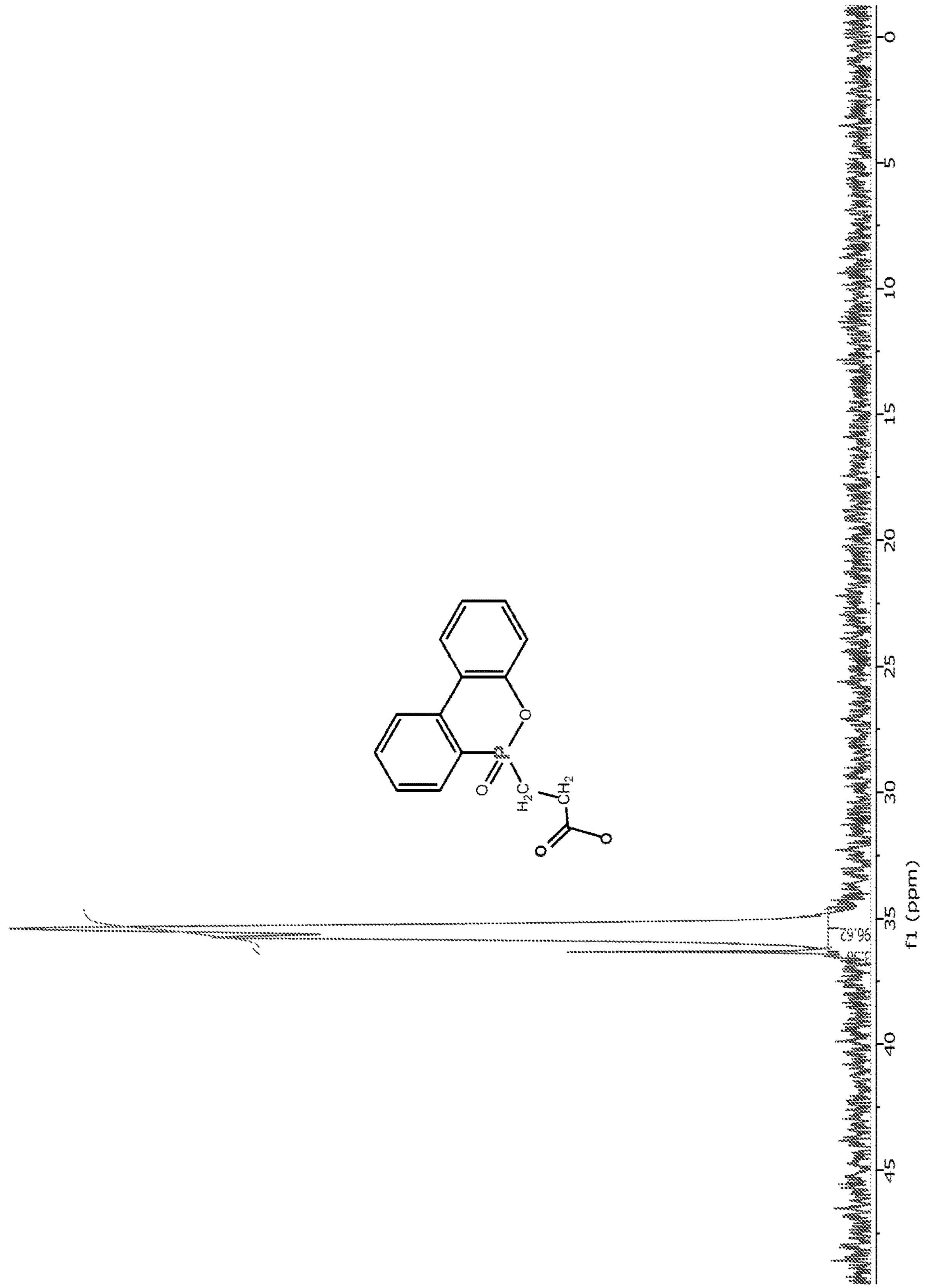
FIG. 1 depicts the $^{31}$P-NMR spectrum measured in DMSO-$d_6$ and shows the high purity of the phosphorus-containing (DOPO-functionalized) cellulose ester (product).

The present invention thus relates to a cellulose derivative of the general formula I Formula I

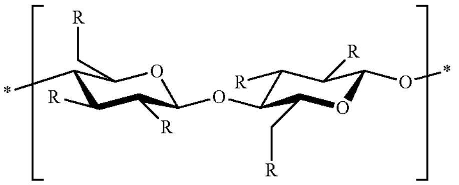

wherein

R is the same or different on each occurrence and is selected from the group consisting of hydroxyl groups, moieties of the general formula II and moieties of the general formula III Formula II

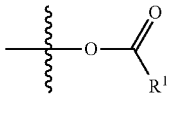

Formula III

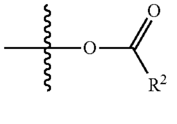

wherein $R^1$ is identical or different on each occurrence and is selected from the group consisting of phosphorus-containing substituents, and $R^2$ is identical or different on each occurrence and is selected from the group consisting of linear or branched alkyl moieties having 1 to 36 carbon atoms, linear or branched arylalkyl moieties having 7 to 36 carbon atoms, with the proviso that in formula I, at least one moiety R is a moiety according to formula II.

In the compounds according to formula II and formula III shown above, the serpentine line denotes the point of attachment of the respective molecular fragment to the cellulose structure according to general formula I. These definitions also apply to all further formulas on which the present application is based.

Surprisingly, it has been found that cellulose derivatives bearing phosphorus-containing groups also have excellent flame retardant properties, in particular for plastic compositions.

An advantage of the novel phosphorus-containing flame retardants is their macromolecular structure, as is increasingly required for flame retardants.

The most important advantage of the flame retardants according to the invention, however, is their high proportion of bio-based structural components.

This is achieved by using cellulose for the polymeric backbone, which is particularly advantageous since cellulose is the most widespread and most abundantly available bio-based substance and has a structure that is favorable for effective flame retardancy. In addition, cellulose is very inexpensive. The use of sugar alcohols or tartaric acid derivatives for the phosphorus-bearing groups is preferred for the particularly high bio-based proportion. Sugar alcohols such as erythritol, xylitol and mannitol are now available in large quantities and increasingly inexpensively, but the use of their phosphorus derivatives in flame retardants is not yet known. In addition, the structure of the flame retardants, in particular that of the phosphorus-bearing groups, can be adapted to the respective intended use, so that areas of application become accessible for which bio-based flame retardants have not been suitable up to now. It is also advantageous that an efficient synthesis sequence for producing the novel flame retardants is according to the invention. Finally, it is advantageous that the substances according to the invention differ structurally significantly from known flame retardants and thus represent a novel class of flame retardants.

The phosphorus-containing cellulose esters according to the invention can be used in plastics as the sole flame retardant or as a constituent of flame retardant mixtures in combination with other flame retardants or substances that enhance the flame retardant effect.

According to a preferred embodiment, it is provided that in the general formula II, the moiety $R^1$ is selected from the group consisting of moieties according to the general formula IV Formula IV

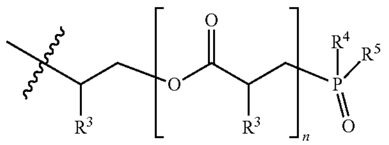

wherein the variables are the same or different at each occurrence and $R^3$ is selected from the group consisting of hydrogen or linear or branched alkyl moieties having 1 to 36, preferably 1 to 6 carbon atoms, $R^4$ and $R^5$ are independently selected from the group consisting of alkyl moieties, aryl moieties, alkyl aryl moieties, arylalkyl moieties, O-alkyl moieties, O-aryl moieties, O-alkyl aryl moieties, N-alkyl moieties, N-aryl moieties, N-arylalkyl moieties, N-alkyl aryl moieties, wherein $R^4$ and $R^5$ and the phosphorus atom can also be part of heterocyclic ring systems, which can be single or multi-membered, and n is 0 or an integer from 1 to 3.

Furthermore, it is advantageous if the heterocyclic ring system is selected from the group consisting of the following moieties

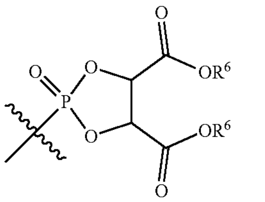

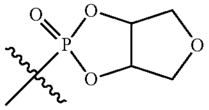

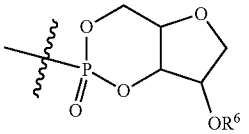

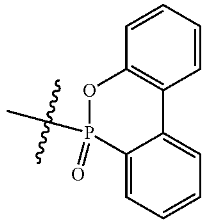

wherein $R^6$ is independently selected from the group consisting of alkyl moieties, aryl moieties, alkyl aryl moieties, arylalkyl moieties, O-alkyl moieties, O-aryl moieties, O-alkyl aryl moieties, N-alkyl moieties, N-aryl moieties, N-arylalkyl moieties and N-alkyl aryl moieties; preferably alkyl moieties having 1 to 12 carbon atoms or alkyl aryl moieties having 7 to 14 carbon atoms.

It is also preferred that $R^2$ is identical or different on each occurrence and is selected from the group consisting of linear or branched alkyl moieties having 1 to 12 carbon atoms, linear or branched arylalkyl moieties having 7 to 14 carbon atoms.

With regard to the substitution pattern, it is advantageous if, based on all moieties R, the molar proportion of the moieties according to formula II is at least 2 mol %, preferably 5 to 100 mol %, more preferably 15 to 95 mol %, particularly preferably 40 up to 90 mol %, of the moieties according to formula III, is 0 to 98 mol %, preferably 0 to 95 mol %, more preferably 5 to 85 mol %, particularly preferably 10 to 90 mol % and/or the hydroxyl groups is a maximum of 50 mol %, preferably 0 to 50 mol %, preferably 0 to 20 mol %, particularly preferably 0 to 10 mol %.

The present invention also relates to a method for producing the cellulose derivative according to the invention by a) esterification and/or transesterification reaction followed by an addition of at least one compound containing a phosphorus-containing substituent, wherein In a first step cellulose is at least partially reacted with at least one esterification reagent which esterifies the hydroxyl groups of the cellulose to form moieties R', wherein R' is a moiety of the general formula V Formula V

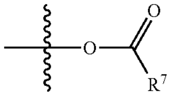

wherein $R^7$ is a functionality that is reactive toward the compound containing at least one phosphorus-containing substituent, or a cellulose ester of the general formula I as defined above, with the proviso that R is the same or different on each occurrence and is selected from the group consisting of moieties of the general formula III, at least partially with at least one transesterification reagent which transesterifies the moieties according to general formula III to form moieties of general formula V, or a mixed cellulose ester of the general formula I as defined above, with the proviso that R is the same or different on each occurrence and is selected from the group consisting of hydroxyl groups and moieties of the general formula III, wherein the mixed cellulose ester comprises both hydroxyl groups and moieties R of the general formula III, with at least one reagent which esterifies the hydroxyl groups of the mixed cellulose ester to form moieties of the general formula V and/or transesterifies the moieties according to the general formula III to form moieties of the general formula V, and in a subsequent second step, at least one compound containing a phosphorus-containing substituent is added to the reactive functionality $R^7$ of the general formula V, or b) by esterification or transesterification, wherein cellulose is at least partially reacted with at least one esterification reagent which esterifies the hydroxyl groups of the cellulose to form moieties R as defined above, wherein at least one hydroxyl group is esterified to an ester group according to formula II based on the total cellulose, or a cellulose ester of the general formula I as defined above, with the proviso that R is the same or different on each occurrence and is selected from the group consisting of moieties of the general formula III, at least partially with at least one transesterification reagent which transesterifies the moieties according to general formula III to form moieties of general formula II, or a mixed cellulose ester of the general formula I as defined above, with the proviso that R is the same or different on each occurrence and is selected from the group consisting of hydroxyl groups and moieties of the general formula III as defined above, wherein the mixed cellulose ester comprises both hydroxyl groups and moieties R of the general formula III, with at least one reagent which esterifies the hydroxyl groups of the mixed cellulose ester to form moieties of the general formula I as defined above and/or transesterifies the moieties according to the general formula III to form moieties of the general formula I, wherein, based on the entire cellulose derivative, at least one hydroxyl group is esterified to an ester group according to formula II and/or the moieties according to general formula III are at least partially transesterified to form moieties of general formula II.

The production of the cellulose derivative according to the invention thus comprises two variants. In variant a) shown above, the production is carried out in two stages, wherein cellulose is first esterified or a cellulose ester is transesterified, followed by the addition of a compound containing a phosphorus-containing substituent. In variant b), as shown above, the esterification or transesterification takes place with a compound already containing a phosphorus-containing substituent. In variant a) or in the production of the compound containing a phosphorus-containing substituent according to variant b), the addition can take place, for example, by a phospha-Michael addition. In particular, variant a) can be carried out by phospha-Michael addition of organophosphorus compounds carrying a reactive hydrogen atom on the phosphorus atom to cellulose esters carrying activated alkenyl groups.

The phospha-Michael addition of the phosphorus compounds to the activated alkenyl groups of the cellulose esters can be carried out with the aid of a base, such as triethylamine, under conditions known to those skilled in the art for phospha-Michael additions.

A preferred embodiment of the variants of the method according to the invention provides that in the a) esterification and/or transesterification reaction followed by an addition of at least one compound containing a phosphorus-containing substituent in the first step, the at least one esterification reagent, the at least one transesterification reagent or the at least one reagent contains or consists of at least one compound selected from the compounds of the general formula VIa and/or VIb, Fomula VIa

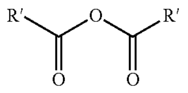

Formula VIb

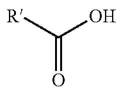

wherein in Formula VIa

R' is the same or different on each occurrence and is selected from moieties according to the general formula VIIa and VIIb and moieties $R^2$ as defined above Formula VIIa

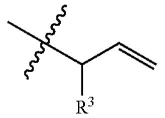

Formula VIIb

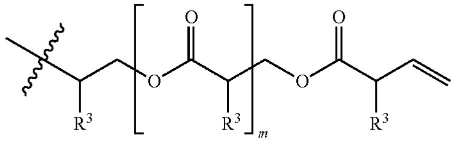

wherein $R^3$ is as defined above, with the proviso that at least one moiety R' is according to formula VIIa or VIIb, and m is 0, 1 or 2, and in formula VIb R' is selected from moieties according to the general formula VIIa and VIIb, and in the subsequent second step, the at least one compound containing a phosphorus-containing substituent is selected from the group consisting of compounds of the general formula VIII Formula VIII

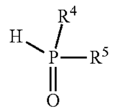

wherein $R^4$ and $R^5$ are independently selected from the group consisting of alkyl moieties, aryl moieties, alkyl aryl moieties, arylalkyl moieties, O-alkyl moieties, O-aryl moieties, O-alkyl aryl moieties, N-alkyl moieties, N-aryl moieties, N-arylalkyl moieties, N-alkyl aryl moieties, wherein $R^4$ and $R^5$ and the phosphorus atom can also be part of heterocyclic ring systems, which can be single or multi-membered or b) in the esterification or transesterification in the first step, the at least one esterification reagent, the at least one transesterification reagent or the at least one reagent contains or consists of at least one compound selected from the compounds of the general formula VIa and/or VIb, Formula VIIIa

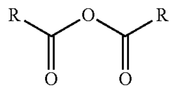

Formula VIIIb

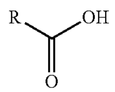

wherein in Formula VIIIa

R is the same or different on each occurrence and is selected from moieties according to the general formula IV as above and moieties $R^2$ as defined above, and in Formula VIIIb R is selected from moieties according to the general formula IV as defined above.

It is further advantageous if in variants a) or b), based on the totality of the hydroxyl groups of the cellulose, ester groups of the cellulose ester or hydroxyl groups and the ester groups of the mixed cellulose ester, 0.1 to 20, preferably 0.5 to 10, particularly preferably 1.0 to 5.0 mol equivalents of the at least one esterification reagent, of the at least one transesterification reagent or the at least one reagent can be used.

In variant a), it is advantageous if, based on the amount of moieties of the general formula V generated in the first reaction step, 0.05 to 10, preferably 0.1 to 5, particularly preferably 0.25 to 1.0 mol equivalents of the at least one compound containing a phosphorus substituent can be used.

The esterification/transesterification is particularly preferably carried out in the presence of transesterification or esterification catalysts.

In addition, the present invention relates to the use of the cellulose derivative according to the invention as a flame retardant, preferably for plastics, in particular for thermoplastics, such as unfilled and filled or reinforced polyesters, polyamides, polyolefins, polycarbonates, PMMA, polystyrene, styrene block polymers such as ABS and SBS, for cellulose esters such as cellulose acetate, cellulose propionate and cellulose butyrate and for polyurethanes and epoxy resins.

The present invention further relates to a flame retardant composition comprising or consisting of a cellulose derivative according to the invention and at least one further flame retardant which differs from the cellulose derivative of the general formula I.

In the flame retardant composition according to the invention, it is particularly advantageous if the at least one further flame retardant differing from the cellulose derivative of the general formula I is selected from the group consisting of metal hydroxides, melamine derivatives, nitrogen bases, phosphates, phosphonates, phosphinates, pyrophosphates, polyphosphates, siloxanes, pentaerythritol and derivatives of these compounds, preferably magnesium hydroxide, aluminum hydroxide, boehmite, melamine polyphosphate, ammonium polyphosphate, melamine cyanurate, zinc pyrophosphate, piperazine pyrophosphate and piperazine polyphosphate, 1,3,5-tris(2-hydroxyethyl) isocyanurate and mixtures and combinations thereof.

The present invention further relates to a plastic composition comprising or consisting of a cellulose derivative composition according to the invention or a flame retardant composition according to the invention.

The method according to the invention can in particular be carried out by the esterification of cellulose with anhydrides or anhydride mixtures, wherein a strong acid, preferably concentrated sulfuric acid, or zinc chloride is preferably used as the catalyst.

Reaction Scheme 1

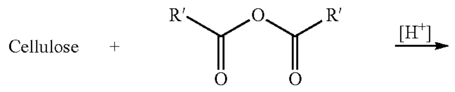

Formula VIa

-continued

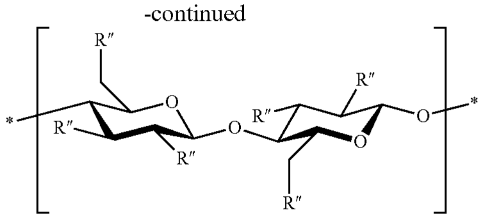

Formula Ia

In Reaction Scheme 1, the moieties R' and R are as defined above. The moiety R" in this case corresponds to a group formed by esterification of a free OH group of the cellulose with the esterification reagent according to formula VIa, or, in the event that not all OH groups of the cellulose are esterified, a free OH group. Normally, no free OH groups remain after esterification with anhydrides (in contrast to esterification with acid chlorides), which is advantageous for the intended use, since OH groups can interfere with the use as a flame retardant additive. The moiety R' is thus an acrylate functionality according to formula VIIa (see above) or a di-, tri- or tetraalkylate functionality according to formula VIIb (see above).

The latter have the advantage of increasing the meltability and solubility of the cellulose esters and can arise in situ during the esterification of the cellulose by acid-catalyzed dimerization or trimerization of acrylic acid. It is advantageous here that the amount of diacrylate or triacrylate substituents in the cellulose esters according to formula I can be controlled by varying the conditions in the reaction according to Reaction Scheme 1. If the esterification is carried out at moderate temperatures (up to approx. 55° C.), only very small amounts of di- or triacrylate groups are introduced. On the other hand, cellulose esters having a considerable proportion of such substituents are formed at somewhat higher reaction temperatures and reaction times. The anhydrides of formula VIa can be produced in an effective manner by reacting acrylic acid with acetic anhydride, wherein the acetic acid formed is continuously distilled from the reaction mixture and, for example, a polymerization inhibitor, preferably phenothiazine, is present. This reaction can be carried out in the presence of a suitable catalyst such as trifluoromethanesulfonic acid or without a catalyst. The principle of this "transanhydridation" is known from the literature or has been described in patents (DE3037301A1; EP0231689B1; US009969670). In a preferred embodiment of the invention, in contrast to the known methods of "transanhydridation", the aim is not a uniform product, for example acrylic anhydride, but rather a mixture of various anhydrides which, when reacted in accordance with Reaction Scheme 1, result in products of the general formula Ia having the desired substitution pattern in each case, which in the phospha-Michael addition result in phosphorus-containing cellulose esters of the formula I, the structural properties of which are adapted to the respective application. The desired ratio between the anhydrides can be achieved by a suitable choice of the reaction conditions in the "transanhydridation" (ratio of the starting materials, reaction time and reaction temperature, catalyst). The introduction of di- or triacryl groups can also be specifically brought about or largely suppressed in "transanhydridation" (the latter being the case with "transanhydridation" without a strongly acidic catalyst and at a moderate reaction temperature). This method has the further advantage that the entire reaction sequence from the generation of the anhydride mixture through the esterification of the cellulose up to and including the phospha-Michael addition can be carried out in the same reaction apparatus, so that the method can be carried out efficiently. The only by-product is acetic acid.

Further anhydrides such as propionic anhydride, butyric anhydride and methacrylic anhydride or mixtures of such anhydrides can be added to the anhydride mixture obtained after the "transanhydridation" in order to introduce propionate, butyrate or methacrylate groups during the esterification of the cellulose. The solubility of the cellulose esters is further improved by introducing groups of this type. In addition, said ester groups also have a positive effect on important properties of the flame retardants according to the invention, such as improved compatibility with the flame-retardant polymers and reduced water absorption.

Alternatively, the method according to the invention can preferably be carried out by transesterification of cellulose alkyl esters, for example, cellulose acetate or cellulose triacetate, with activated alkenyl group-bearing carboxylic acids, for example, with acrylic acid, in the presence of suitable transesterification catalysts and polymerization inhibitors, wherein the carboxylic acid released from the reaction mixture is distilled in a partial vacuum (Reaction Scheme 2).

Reaction Scheme 2

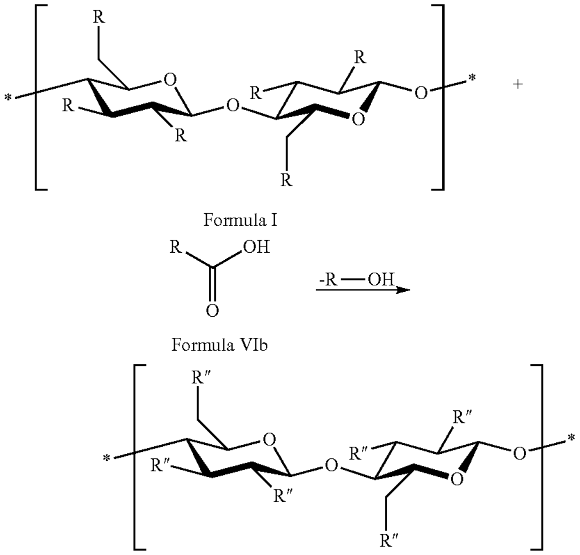

Formula I

Formula VIb

Formula Ia

In Reaction Scheme 2, the moieties R stand for $R^3$ as defined above. The moiety R" here corresponds to a moiety arising by transesterification of an ester group R group of cellulose with the esterification reagent according to formula VIb, or, in the event that not all ester groups of the cellulose are transesterified, an ester group $R^3$.

The present invention is explained in more detail with reference to the following examples, without restricting the facts to the embodiments shown.

EXAMPLE 1

Synthesis of an Anhydride Mixture from Acrylic Acid and Acetic Anhydride

The reaction apparatus, consisting of a 500 ml two-necked flask with a nitrogen inlet and a heat-insulated distillation column, a Liebig condenser with a thermometer and a receiver connected to a pressure-controllable membrane pump, was vacuum-dried and filled with nitrogen. Acetic anhydride (1.50 mol; 153 g); anhydrous acrylic acid (3.00 mol; 216 g) and phenothiazine (1.0 g) were then added to the two-necked flask and the flask immersed in an oil bath preheated to 55° C. After the nitrogen supply had been stopped, the oil bath target temperature was increased to 92° C. over the course of an hour and the pressure was lowered to 115 mbar, after which the distillation of the acetic acid began (head temperature approx. 62-64° C. at 115 mbar; corresponds to the expected boiling point of acetic acid at this pressure). The distillation was continued for 6 h, wherein the oil bath temperature was increased to 95° C. and the pressure was reduced to 108 mbar. The apparatus was then filled with nitrogen. After a further 35 g of acrylic acid had been added, the supply of nitrogen had been stopped and the pressure had been reduced to 103 mbar, the distillation was continued for two hours (oil bath temperature 96° C.), wherein the pressure was gradually reduced to 90 mbar. The apparatus was then filled with nitrogen again, and a further 75 g of acrylic acid and 0.5 g of phenothiazine were added. The heating in the partial vacuum was continued for a further 6 h, wherein the oil bath temperature was 95-97° C. and the pressure was gradually reduced to 75 mbar. A total of approx. 180 g of distillate were collected in the receiver, which largely consisted of acetic acid (examined by NMR spectroscopy). After the receiver had been changed, the excess acrylic acid was distilled off with a further reduction in pressure. An almost colorless residue remained, which had the following composition (determined by NMR spectroscopy): acrylic anhydride ($(AcS)_2A$): approx. 82%; mixed acrylic acid-acetic anhydride (AcSESA): approx. 8%; acetic anhydride: approx. 2%; acrylic acid: approx. 3%; acetic acid: 1%: anhydrides of oligomeric acrylic acids: approx. 4%.

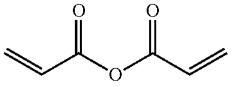

$(AcS)_2A$

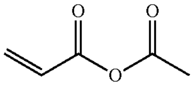

AcSESA

The amount of anhydride mixture thus obtained was approx. 205 g.

Said anhydride mixture was subjected to vacuum distillation using a short column. After the forerun (approx. 25 g), which was obtained at a pressure of 25 mbar, the product fraction was distilled with a further reduction in pressure to 4 mbar. 165 g of the product fraction were obtained, which contained approx. 90% $(AcS)_2A$, 6% AcSESA and approx. 1% acetic anhydride and approx. 2% acrylic acid (acetic acid and anhydrides of oligomeric acrylic acids each 1%). Approx. 15 g of distillation residue remained, which largely consisted of anhydrides of oligomeric acrylic acids.

EXAMPLE 2

Synthesis of a Cellulose Acrylate Acetate from Cellulose and the Anhydride Mixture from Example 1

3.0 g of cellulose wadding were placed in a 250 ml three-necked flask equipped with a mechanical stirrer (stirrer blade made of PTFE, stirrer shaft PTFE-coated). The apparatus was then dried in a vacuum and then filled with nitrogen. Then 20 g of the distilled anhydride mixture obtained in Example 1 and 34 g of acrylic acid and approx. 0.3 g of sulfuric acid and phenothiazine (approx. 100 mg) were added. It was stirred vigorously in order to distribute the reagents as evenly as possible on the cellulose wadding, which soaked up the entire amount of reagents. It was stirred for 20 min at room temperature. Within a further 20 min, the temperature was increased to 50° C. and then gradually increased to 58-60° C. (over the course of 15 min). As it heated, the wadded pad became more compact and formed chunks that gradually disintegrated. A liquid phase formed, the volume of which increased. Approx. 150 min after the addition of the reagent, the reaction mixture was almost homogeneous, relatively thin and had a light yellow color. Stirring at 58-60° C. was continued for a further 2 h, then the oil bath was removed. The contents of the flask, which were still warm, were stirred in 300 ml of cyclohexane. Stirring at room temperature was continued for 45 min and then the crude product was isolated by filtration through a G3 glass frit. The crude product was then transferred to a round bottom flask and dried in a fine vacuum, with careful heating. In the meantime, the chunks were comminuted (flask filled with nitrogen beforehand). 60 ml of toluene and 50 mg of phenothiazine were then added. The mixture was then stirred for approx. 40 min at approx. 50° C. (under nitrogen). It was decanted after cooling. The remaining residue was stirred a second time in toluene (40 ml, 50°, 45 min) and, after decanting, washed twice with 10 and 5 ml of toluene. The residue was then heated in a vacuum (approx. 0.1 mbar) to 100° C. over the course of 3 h, wherein a light brown powder resulted (approx. 3 g yield). The proton NMR spectrum of the cellulose acrylate acetate thus obtained showed complete conversion of the OH groups. The spectrum showed that approx. 70% of the OH groups were acrylicized (R1: CH═CH2) and approx. 28% were acetylated (R1: CH3) (proportion of diacrylate groups ≤3%).

EXAMPLE 3

Synthesis of a Cellulose-Acrylate-Acetate-Propionate Diacrylate from Cellulose, the Anhydride Mixture from Example 1 and Propionic Anhydride 3.3 g of cellulose wadding were placed in a 250 ml three-necked flask equipped with a mechanical stirrer (stirrer blade made of PTFE, stirrer shaft PTFE-coated). The apparatus was then dried in a vacuum and then filled with nitrogen. 20 g of the distilled anhydride mixture obtained in Example 1, 1.5 g of propionic anhydride, 37 g of acrylic acid, approx. 0.3 g of sulfuric acid and phenothiazine (approx. 100 mg) were then added in a nitrogen countercurrent. The wad absorbed the complete liquid mixture of the reagents. The reaction mixture was stirred for 10 minutes at room temperature and then it was heated to 58° C. by means of an oil bath, during which it was always stirred and blanketed with nitrogen. Approx. 1.5 hours after the reaction temperature had been reached, the wad had dissolved to a few chunks and approx. one hour later the reaction mixture was homogeneous, low-viscosity and orange in color. It was stirred at an oil bath temperature of 58-63° C. for a total of 4.5 h. After cooling to approx. 40° C., most of the liquid constituents were distilled in a vacuum into a cold trap (approx. 8 mbar). The temperature was increased to 50° C. in the course of the distillation. The distillation was stopped when the viscosity had increased significantly. The viscous liquid was added to a flask containing 200 ml of cyclohexane in a nitrogen countercurrent with stirring, wherein the product precipitated as a solid. It was stirred for approx. 30 min at room temperature, then for approx. 15 min at 45° C. After cooling to room temperature, it was filtered through a G3 glass frit (not inert). The product was then transferred to a flask and 40 ml of toluene and 50 ml of methyl tert-butyl ether were added. This mixture was stirred for 30 min at 50° C. under nitrogen. The suspension obtained was then filtered through a G3 glass frit. The product was then transferred back to a round-bottomed flask and stirred again for 30 min in 50 ml of methyl tert-butyl ether at 50° C. under nitrogen. It was then filtered again through a G3 glass frit (not inert). The filter residue was washed twice with 20 ml of methyl Cert-butyl ether each time. The product was dried at 40° C. in a fine vacuum (yield 3.5 g).

The proton NMR spectrum of the cellulose-acrylate-acetate diacrylate thus obtained showed complete esterification of the OH groups. The spectrum showed that a total of approx. 50% of the OH groups were esterified with acrylate groups ($R_7$: CH═$CH_2$) and diacrylate groups ($R_7$: $CH_2$—CH, —O—COCH═$CH_2$), approx. 15% of the OH groups were esterified with acetate groups ($R_7$: $CH_3$) and approx. 35% with propionate groups ($R_7$: $CH_2$—$CH_3$).

EXAMPLE 4

Synthesis of a Cellulose Acrylate Acetate by Transesterification of Cellulose Acetate with Acrylic Acid 50 g of anhydrous acrylic acid and 10 g of cellulose acetate and the stabilizer (4-methoxyhydroquinone; 0.25 g) were added in a vacuum-dried distillation apparatus which was equipped with a three-necked flask, heavy magnetic stirrer, Liebig condenser, nitrogen supply and a cooled receiver that was connected to a bubble counter. Now the nitrogen flow was turned on in order to blanket the reaction mixture with nitrogen. However, since the stabilizer needs oxygen to be active, approx. 20 ml of ambient air was injected into the flask through a septum every 15 minutes with the aid of a syringe. The oil bath was then heated to 105° C. with a heating magnetic stirrer and placed such that the contents of the flask were approx. 1 cm below the level of the oil. The contents of the flask were vigorously stirred. 0.3 g of trifluoromethanesulfonic acid and then 0.5 g of anhydrous aluminum chloride were added as soon as all of the cellulose acetate had dissolved in the acrylic acid. It was stirred for 4.5 h at an oil bath temperature of 105° C., wherein a gentle stream of nitrogen was passed through the apparatus. The reaction mixture turned dark in color.

After the reaction mixture had cooled slightly (oil bath temperature 100° C.), approx. 100 mg of the stabilizer phenothiazine were added. Most of the unreacted acrylic acid and the acetic acid formed in the reaction were then distilled, starting with a pressure of approx. 400 mbar, which was reduced in steps of 50 mbar to approx. 150 mbar. The distillate was condensed in a liquid nitrogen cooled flask. The NMR spectroscopic examination of the distillate showed that it consisted of acrylic acid and acetic acid.

The distillation residue was dissolved in 100 ml dichloromethane. The solution was stirred with 200 ml of an 18% strength ammonium hydrogen carbonate solution (release of carbon dioxide). After the release of carbon dioxide had subsided, the aqueous phase was separated off in a separating funnel. After adding given the separating funnel, carefully shaken. The dichloromethane phase was dried over anhydrous magnesium sulfate. After the drying agent had been separated off (filtration), the dichloromethane was removed by means of a rotary evaporator. The solid was then dried in a vacuum to remove any dichloromethane moieties still present. A light brown solid was obtained (yield 8.8 g), the NMR spectroscopy examination of which showed that approx. one third of the acetate groups had been replaced by acrylate groups.

EXAMPLE 5

Synthesis of a Phosphorus-Containing Cellulose Ester from the Cellulose Acrylate Acetate of Example 2 and 9,10-dihydro-9-oxa-10-phosphaphenathrene-10-oxide (DOPO)

1 g of cellulose acrylate acetate from Example 2 and about 30 mg of 4-methoxyhydroquinone (MEHQ) were added, then 8 ml of dry tetrahydrofuran and 1.5 ml of triethylamine were added in a Schlenk flask (which contained a heavy stir bar), carefully vacuum-dried and filled with nitrogen. The mixture was then heated to approx. 50° C. and 1.4 g of DOPO were added in a nitrogen countercurrent. The reaction mixture was stirred for 3 h at 50° C. under a nitrogen atmosphere with stirring under a nitrogen atmosphere, wherein a solid precipitated out. This was isolated by means of decanting and first heated to approx. 90° C. with toluene (15 ml) while stirring and then stirred (decanted in each case) in acetonitrile (10 ml, approx. 70° C.). In order to dry the product obtained in this way, it was heated in a vacuum (approx. 0.1 mbar) with stirring to 125° C. for 4 h and then heated to 145° C. for 30 min. After drying, a phosphorus-containing (DOPO-functionalized) cellulose ester was obtained as a brownish-white powder (1.8 g). The $^{31}$P-NMR spectrum shown in FIG. 1 shows (measured in DMSO-$d_6$) the high purity of the phosphorus-containing (DOPO-functionalized) cellulose ester.

EXAMPLE 6

Synthesis of a Phosphorus-Containing Cellulose ester 1 from the Cellulose-Acrylate-Acetate-Propionate Diacrylate of Example 3 and 9,10-dihydro-9-oxa-10-phosphaphenathrene-10-oxide (DOPO)

A 100 ml Schlenk flask equipped with a heavy magnetic stir bar was heated in a vacuum to remove traces of moisture and then filled with nitrogen. 1.2 g of the cellulose-acrylate-acetate-propionate diacrylate obtained in Example 3, 15 ml of dry acetonitrile and 1.5 ml of dry triethylamine were then added in a nitrogen countercurrent. This mixture was heated to 60° C. with vigorous stirring by means of an oil bath and magnetic heating stirrer. After the starting material had dissolved, 1.5 g of DOPO were added in a nitrogen countercurrent.

The temperature of the oil bath was then increased to 78° C. A further portion of DOPO (0.27 g) was added after 2.5 h at the same temperature. It was stirred for a further hour at 78° C. under a nitrogen atmosphere. After cooling, the tightly closed flask was stored in the refrigerator overnight. A gel-like precipitate had precipitated out. The supernatant solution was removed after warming to room temperature. 25 ml of toluene were then added and it was heated to the boiling point of the toluene with vigorous stirring. The toluene solution was decanted after the contents of the flask had cooled. The heating with toluene was repeated with half the amount of the solvent.

The solid (product) thus obtained was dried in a vacuum (approx. 0.1 mbar). This was done with stirring in order to comminute chunks of solid matter. The product was dried initially at room temperature, then heated to 90° C. for 4 hours and finally the product was dried at 115° C. for 4 h. After drying, a phosphorus-containing (DOPO-functionalized) cellulose ester was obtained as a white powder (1.9 g).

Figure 2A:
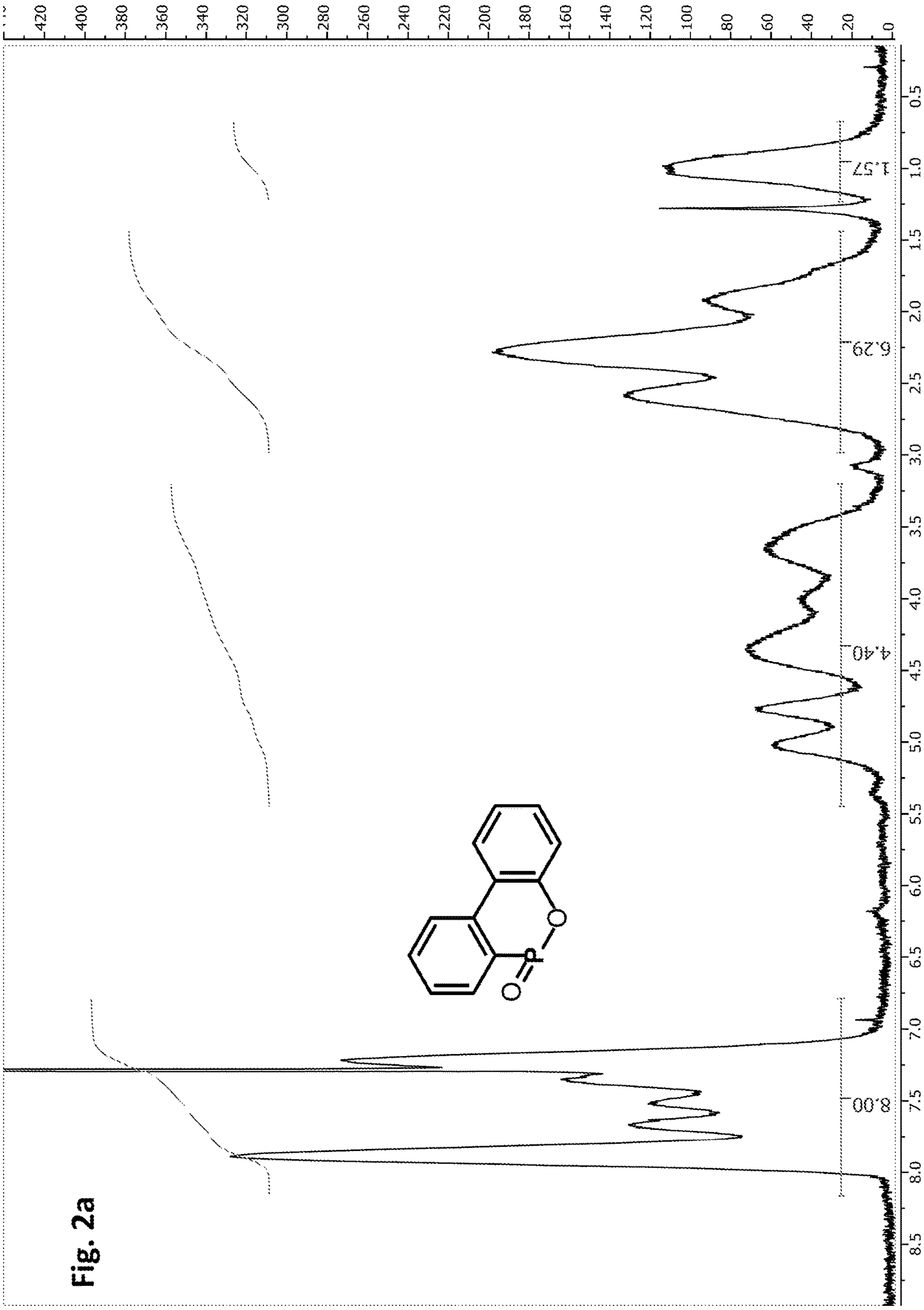
FIG. 2*a* depicts the $^{1}$H-NMR spectrum of the product (measured in $CDCl_3$) showing complete conversion of the acrylate and diacrylate groups and complete removal of traces of solvent and amine.
Figure 2B:
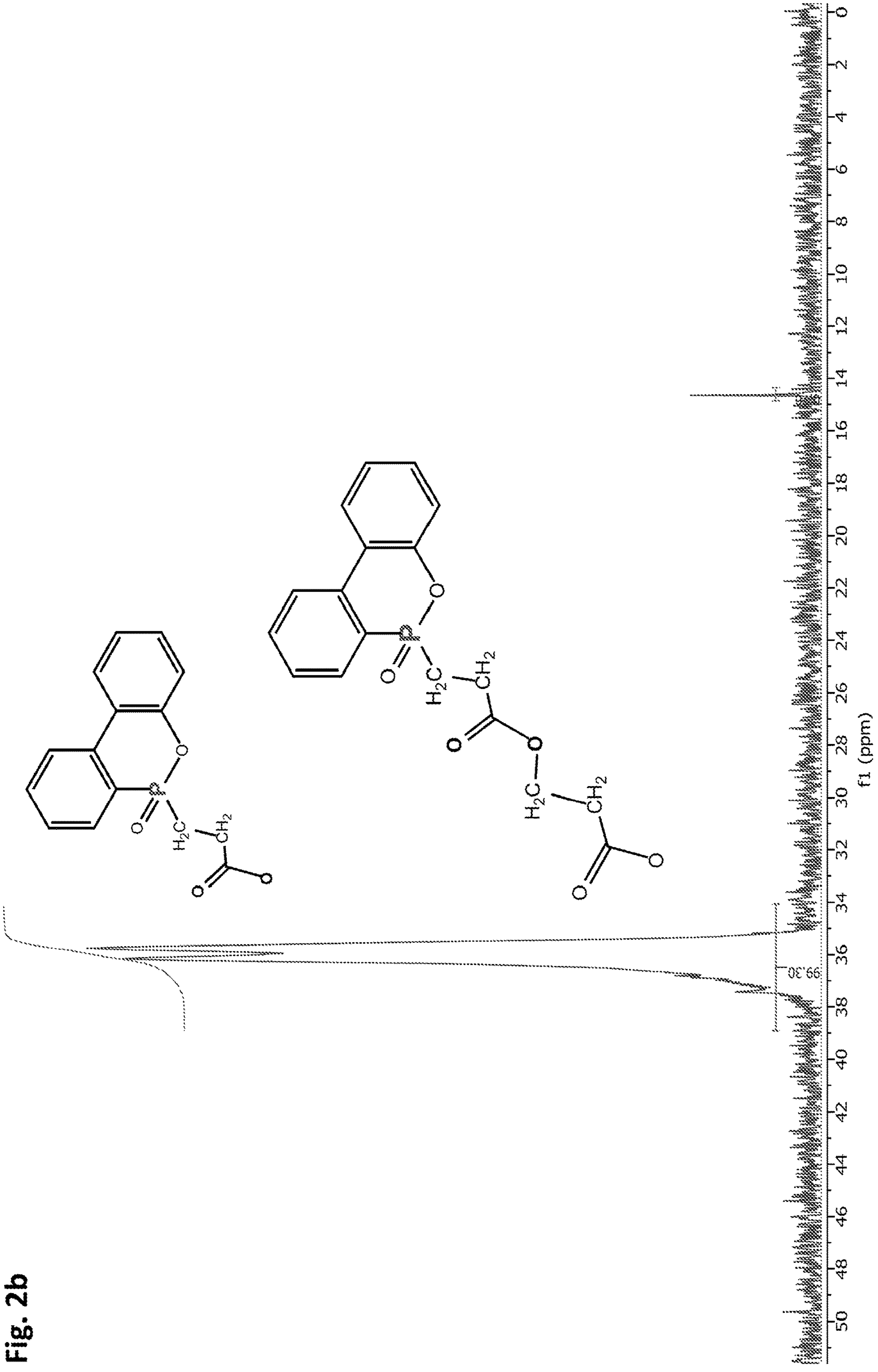
FIG. 2*b* depicts the $^{31}$P-NMR spectrum (measured in $CDCl_3$) confirms the high purity of the product.

The $^{1}$H-NMR spectrum of the product (measured in $CDCl_3$) shown in FIG. 2*a* showed complete conversion of the acrylate and diacrylate groups and complete removal of traces of solvent and amine. The $^{31}$P-NMR spectrum shown in FIG. 2*b* (measured in $CDCl_3$) confirms the high purity.

Figure 2C:
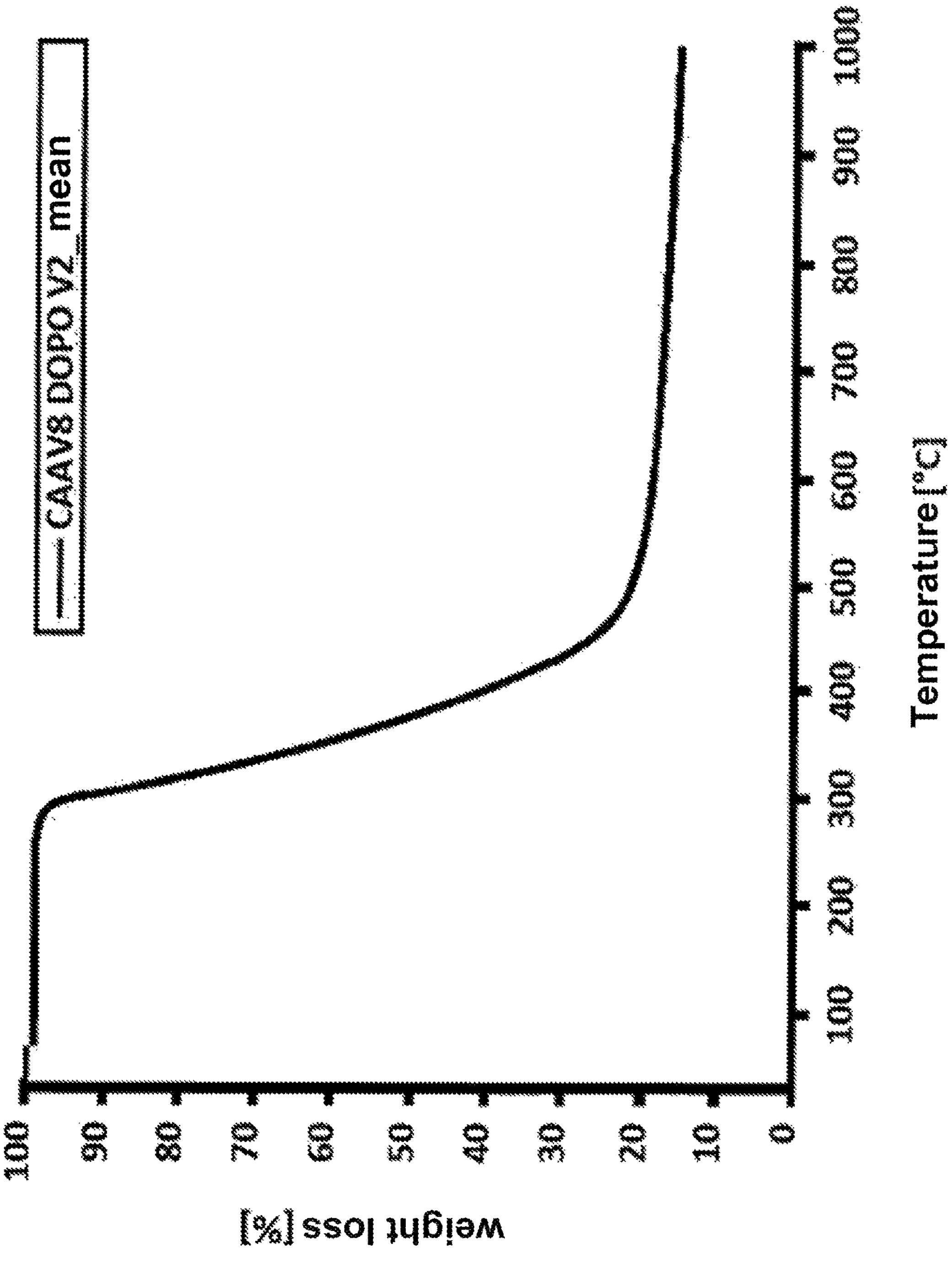
FIG. 2*c* depicts the thermogram (TGA curve) of the product and shows good thermal stability.

The thermogram (TGA curve) shown in FIG. 2*c* shows good thermal stability of the product.

EXAMPLE 7

Synthesis of a Phosphorus-Containing Cellulose Ester from Cellulose-Acrylate-Acetate-Propionate-Diacrylate and Phosphorylated Anhydroerythritol (PAHE)

The phosphorylated anhydroerythritol (PAHE) required for this synthesis was prepared from erythritol and dimethyl phosphite by means of a synthesis method known from the literature (G. Lapienis, St. Penczek, Journal of Polymer Science: Part A: Polymer Chemistry, 1990, 28, 1743-1762).

Figure 3:
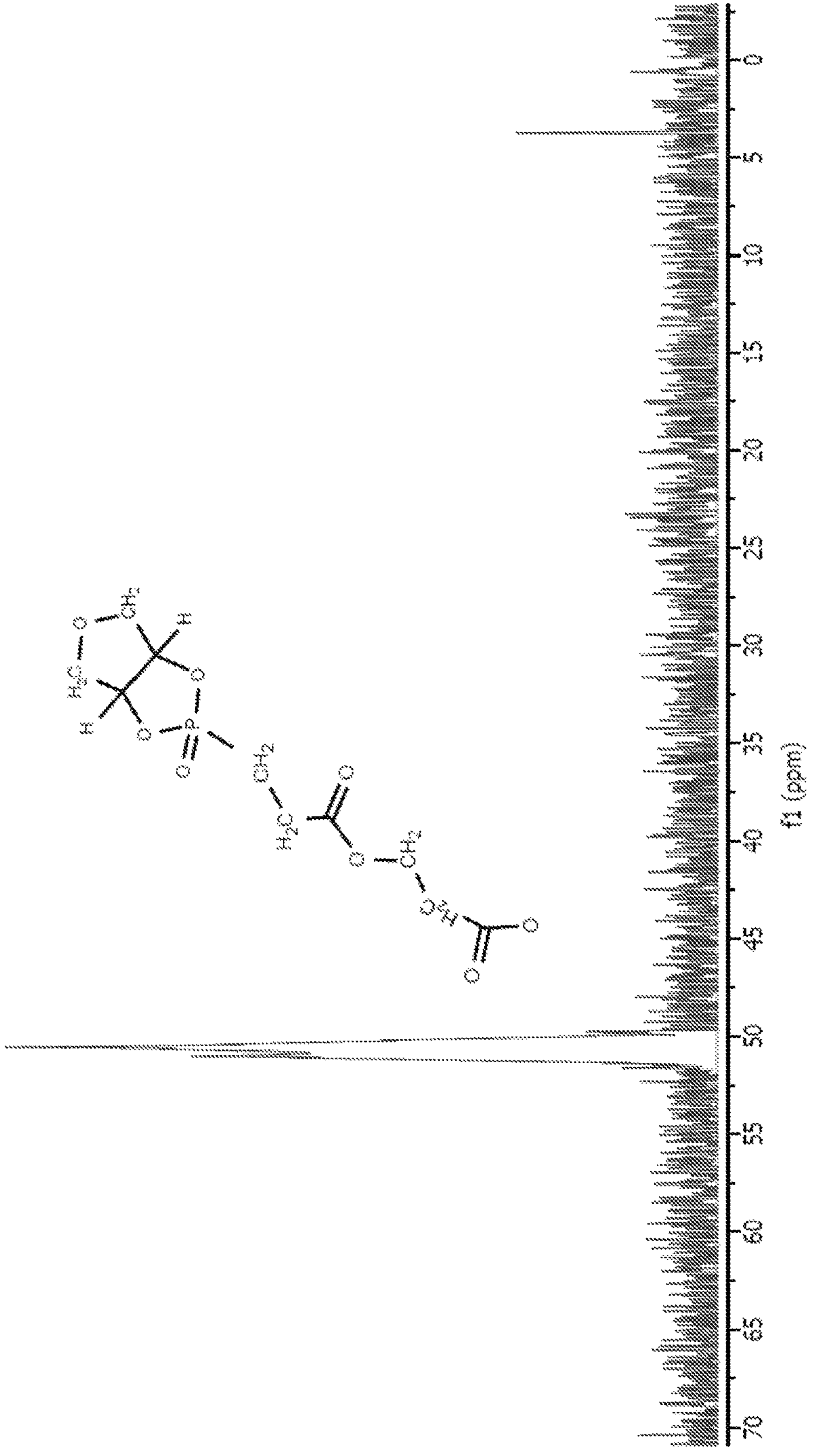
FIG. 3 depicts the $^{31}$P-NMR spectrum of the product (measured in $CDCl_3$) and confirms the high purity.

A 100 ml Schlenk flask equipped with a heavy magnetic stir bar was heated in a vacuum to remove traces of moisture and then filled with nitrogen. 1 g of the cellulose-acrylate-acetate-propionate diacrylate obtained in Example 3, 5 ml of dry acetonitrile and 1.5 ml of dry triethylamine were then added in a nitrogen countercurrent. This mixture was heated to 70° C. with vigorous stirring by means of an oil bath and magnetic heating stirrer. After the starting material had dissolved, a solution of 0.65 g of PAHE in 5 ml of acetonitrile was added in a nitrogen countercurrent over the course of 45 min through a septum with stirring. After 4 h at 75° C. and subsequent cooling of the solution, it was added to 40 ml of toluene with stirring, wherein the product precipitated. After decanting the toluene, the solid obtained was dried in a vacuum (approx. 0.1 mbar) (4 h at room temperature, 3 h at 80° C. and 2 h at 100° C.). A PAHE-functionalized cellulose ester was obtained as a white powder (1.2 g). The $^{31}$P-NMR spectrum shown in FIG. 3 (measured in $CDCl_3$) confirms the high purity.

EXAMPLE 8

Synthesis of a Cellulose-Acrylate-Acetate-Propionate from Cellulose and an Anhydride Mixture Synthesized according to Example 1

15 g of cellulose (bio-cellulose) were placed in a dry 500 ml three-necked flask with a KPG stirrer (stirrer shaft PTFE-coated, PTFE stirring blade), then the flask was dried in a vacuum and filled with nitrogen. Then 100 mg of phenothiazine was added. 150 g of anhydrous acrylic acid were then added and the mixture was carefully stirred for 3 min. Then 87 g of acrylic anhydride synthesized according to Example 1 and 4.5 g of propionic anhydride were added and the mixture was stirred for a few minutes, wherein the wad was wet well. Then 1.25 g of conc. sulfuric acid was added, wherein yellow color occurred. The pulp soaked up almost all of the reagents. It was then stirred for 10 min at room temperature and then the temperature was increased to approx. 57-58° C. within approx. 40 min. It was stirred. The wadded pad disintegrated as soon as it was heated and gradually began to dissolve or disintegrate. There was only a little suspended solid about 100 min after the addition of the reagent. After a further hour, the reaction mixture was largely homogeneous and relatively thin. However, it still contained some solid. The color was light brown. Stirring at 56-59° C. was continued for a further 2 h, resulting in a solution that was homogeneous except for minimal cloudiness (still pale brown). The oil bath was then removed.

Immediately thereafter, the flask was equipped with a distillation bridge with a receiver cooled by means of liquid nitrogen. The more volatile constituents of the solution were then distilled first in the vacuum of the membrane pump (min pressure approx. 5 mbar) and then in the fine vacuum, wherein the oil bath temperature was increased to approx. 55° C. A distillate that was examined by NMR spectroscopy was collected. The examination showed that said distillate consists of >99% acrylic acid and acrylic anhydride.

Approx. 400 ml of cyclohexane were added to the distillation residue without cooling, and it was stirred under a nitrogen atmosphere. After the gel had suspended in the cyclohexane, it was stirred for approx. 30 min, wherein the oil bath temperature was increased to 55° C. The crude product precipitated out as a fine-grained solid, which was suctioned off by means of a large G3 glass frit. The brownish filter cake was transferred back to the flask, then approx. 300 ml of methyl Cert-butyl ether were added and it was heated to approx. 55° C. with stirring. The oil bath was then removed and allowed to cool for a few minutes. Then the product was suctioned off with the G3 glass frit. This work step was repeated three times (each time with approx. 200 ml of methyl tert-butyl ether). The suction was faster after each treatment with methyl Cert-butyl ether since the product welled up. The first methyl tert-butyl ether filtrate was distinctly yellow and slightly cloudy, the second already pale yellow and clear and the filtrates 3 and 4 were almost colorless.

After the fourth treatment with methyl tert-butyl ether, the product was transferred to a 500 ml flask and dried for 30 min at an oil bath temperature of max. 60° C. in a fine vacuum. A flour-colored powder was obtained, which was examined by means of NMR spectroscopy. The product was subjected to a further treatment with methyl tert-butyl ether, suctioned off by means of the G3 frit and then dried at a maximum of approx. 55° C. in a fine vacuum. Spectra of the product thus obtained were recorded in deutero-chloroform and deutero-DMSO, which showed that approx. 70% of the OH groups of the cellulose were esterified with acrylate groups.

Most of the remaining OH groups were esterified with propionate groups and to a lesser extent with acetate groups. Small amounts of diacrylate groups were also introduced. No free OH groups remained. 25 g of the product were obtained as a white powder.

EXAMPLE 9

Synthesis of a Cellulose-Acrylate-Acetate-Propionate from Cellulose and an Anhydride Mixture Synthesized according to Example 1 with the Use of Zinc Chloride as a Catalyst 1.2 g of cellulose (organic cellulose made from cotton fibers) were placed in a dry 100 ml three-necked flask with a magnetic stirrer. The flask was then dried in a vacuum and then filled with nitrogen. Then 10 mg of phenothiazine was added. 12 g of acrylic acid were then added and carefully stirred for 3 min. 7 g of the acrylic anhydride synthesized according to Example 1 and 0.36 g propionic anhydride were then added and stirred for a few minutes, wherein good wetting of the wad was achieved. 0.25 g of zinc chloride was then added at room temperature (flask under nitrogen). The pulp soaked up almost all of the reagents. It was then stirred at room temperature for 10 minutes and then the temperature was increased to 57° C. within 40 minutes. Ten minutes later the temperature was increased to 63° C. One hour later the temperature was increased to 75° C. After a further 0.3 g of zinc chloride had been added, the temperature was increased to 85° C. Now more and more liquid formed and the wad became less and less. The reaction mixture remained under these conditions for a further hour and a half. The reaction mixture was heated to 87° C., wherein it became homogeneous. After two hours, the temperature was increased to 90° C. and remained in that state for approx. 40 minutes before the heater was turned off.

The reaction mixture was stirred into 80 ml of cyclohexane at 50° C., wherein the product precipitated as a brownish solid. It was then decanted. 80 ml of methyl tert-butyl ether were then added to the product and this mixture was heated to 55° C. with vigorous stirring. As soon as said mixture had cooled down, it was decanted again. This process was carried out three more times before the product was dried for approx. two hours at 55° C. in a fine vacuum.

1.3 g of cellulose acrylate acetate propionate were obtained, the NMR spectra of which are almost identical to those of the product from Example 8 (approx. 70% of the OH groups esterified with acrylate groups, the remaining OH groups esterified with propionate and acetate groups).

EXAMPLE 10

Synthesis of a Phosphorus-Containing Cellulose Ester from the Cellulose Acrylate Acetate Propionate of Example 8 and Phosphorylated Anhydroerythritol (PAHE)

The phosphorylated anhydroerythritol (PAHE) required for this synthesis was prepared from erythritol and dimethyl phosphite by means of a synthesis method known from the literature (G. Lapienis, St. Penczek, Journal of Polymer Science: Part A: Polymer Chemistry, 1990, 28, 1743-1762).

In a 250 ml Schlenk flask equipped with a heavy stirrer core, the opening was closed with a septum and this was connected to the Schlenk line. A vacuum was then applied with the aid of a rotary vane pump and the flask was heated with a hot air blower to remove traces of moisture and then the flask was filled with nitrogen. This process was repeated three times before 9 g of the cellulose ester from Example 8 and approx. 0.05 g of phenothiazine were added to the flask in a nitrogen countercurrent. 75 ml of acetonitrile were then passed through the septum and this mixture was heated to 60° C. with vigorous stirring and under nitrogen with the aid of an oil bath and a magnetic heating stirrer. Most of the starting material dissolved. 12 ml of triethylamine were then added and the temperature was increased further to 70° C. When the oil bath had reached 70° C., a somewhat warmed solution of 7.68 g PAHE and approx. 24.7 g acetonitrile were added through the septum with the aid of a syringe and a cannula over a period of 40 minutes. The oil bath temperature was increased to 78° C. after the complete mixture was added. The reaction mixture remained under these conditions for 70 min. In the meantime, the mixture was almost completely clear and its color was now light yellow. A solution of 1.5 g of PAHE in 3.7 g of acetonitrile was then added and the mixture was stirred for a further three hours under unchanged conditions. The solution was stirred for a further 1 h under unchanged conditions. The oil bath was then removed, the nitrogen flow and the stirring magnet turned off and the flask was stored tightly closed for 12 hours at room temperature.

Then some of the volatile constituents (approx. 35 ml) were distilled into a cold trap and warmed slightly in the process. The oily distillation residue was stirred with vigorous stirring by means of a syringe in 225 ml of dry toluene (argon atmosphere) within 25 min, at the end of which it was heated to approx. 50° C. (oil bath temperature). A few minutes after the addition was complete, the oil bath was removed. A small amount of solid, which remained in the flask in which the product solution was previously, was not added. At the end of the addition, however, a tough reddish-brownish body had emerged. It was decanted from the toluene phase. The crude product was then dissolved in 35 ml of dry acetonitrile with heating (oil bath 60° C.). The viscous solution thus obtained was added in portions by means of a syringe to 125 ml of dry toluene within 20 min (under nitrogen), with vigorous stirring. A third and fourth reprecipitation were carried out in the same way. The product thus obtained was heated to 100° C. in a fine vacuum for 1.5 h. The heating was interrupted twice in order to comminute chunks. After approx. an hour, a powder was obtained which was stirred vigorously. Drying was then continued at an oil bath temperature of 130° C. (two and a half hours). Finally, it was dried in a fine vacuum at 135° C. for a further 30 min.

Figure 4:
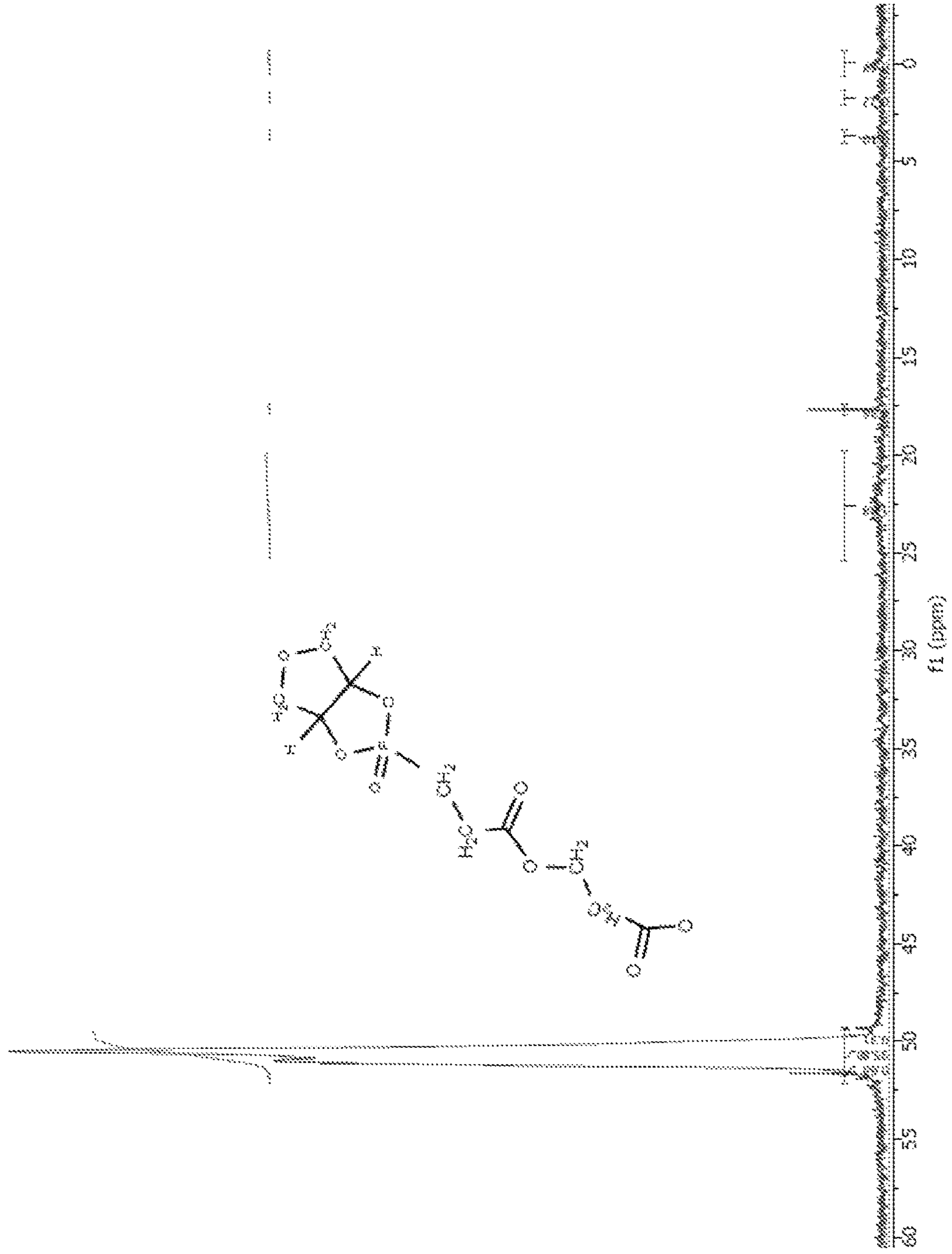
FIG. 4 depicts the $^{31}$P-NMR spectrum of the product wherein the product signal comprises approx. 96 mol% of the P compounds. The proton spectrum showed a conversion of the acrylate functionalities of ≥ 95%.

In the $^{31}$P-NMR spectrum of the product thus obtained, the product signal comprises approx. 96 mol % of the P compounds (see FIG. 4). The proton spectrum showed a conversion of the acrylate functionalities of ≥95%.

14.5 g of a white powder were obtained (12 g sent to the University of Hamm-Lippstadt). The isolated yield is approx. 84% (theoretical yield: approx. 17.3 g).

Figure 5:
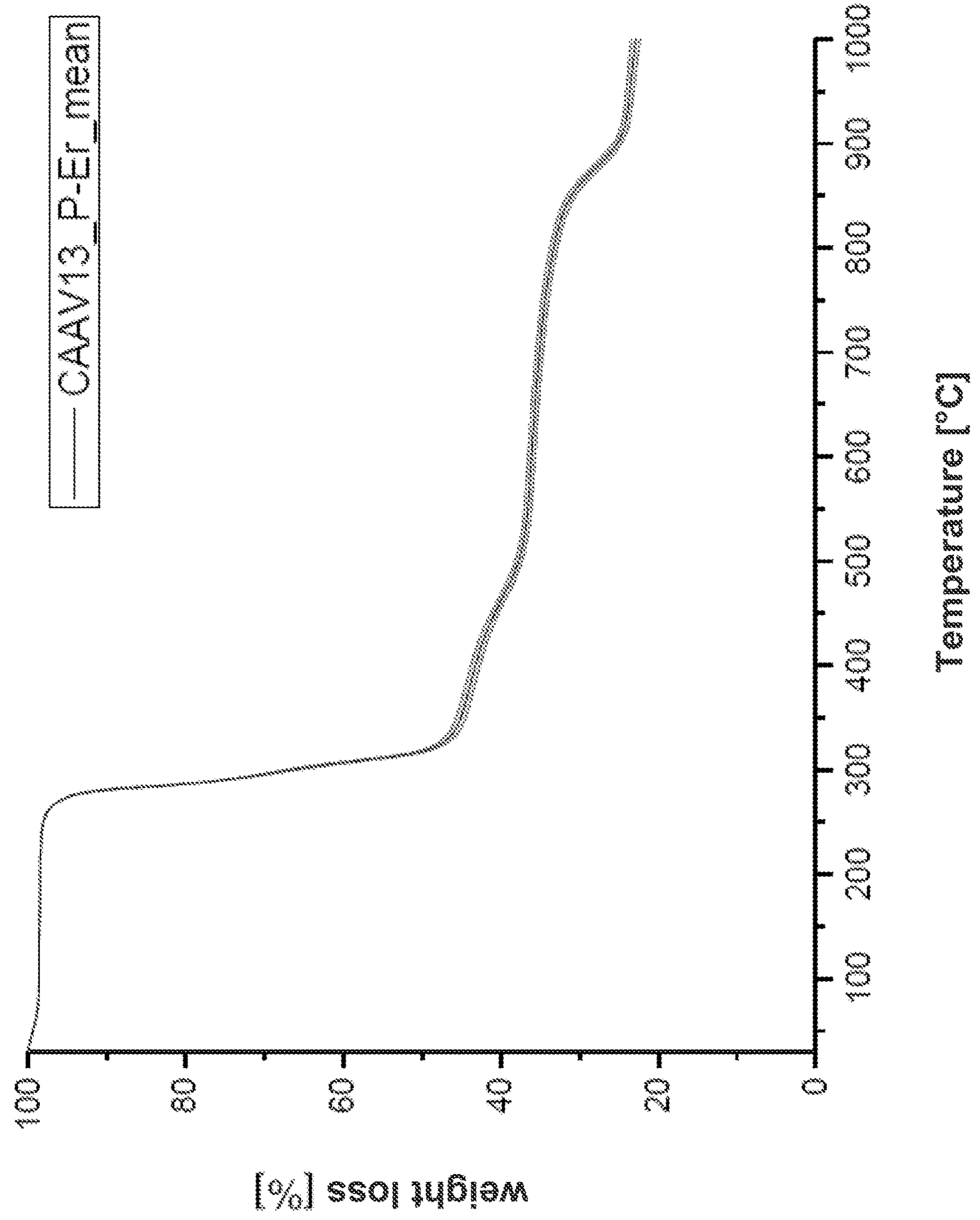
FIG. 5 depicts the thermal analysis of the product, measured three times, and shows an onset of decomposition at approx. 250° C.

The thermal analysis of said product shows an onset of decomposition at approx. 250° C. (see FIG. 5, measured three times).

EXAMPLE 11

Synthesis of a Phosphorus-Containing Cellulose Ester from the Cellulose-Acrylate-Acetate-Propionate of Example 8 and DOPO A 500 ml three-neck Schlenk flask equipped with a KPG stirrer was heated in a vacuum to remove traces of moisture and then filled with nitrogen. 8.7 g of the cellulose-acrylate-acetate-propionate obtained in Example 8, approx. 100 mg of phenothiazine, 120 ml of dry acetonitrile and 12 ml of dry triethylamine were then added in a nitrogen countercurrent. This mixture was heated to 70-75° C. with vigorous stirring by means of an oil bath and magnetic heating stirrer.

A solution of 12 g of DOPO in acetonitrile was then added in the course of 45 min with the aid of a syringe while stirring in a nitrogen countercurrent. It was stirred under a nitrogen atmosphere at 75° C. for two hours, wherein the product precipitated.

An NMR sample of the precipitated product showed that approx. 97.5% of the phosphorus components belong to the product and the conversion of the acrylate functionalities was almost complete (≥97%).

Figure 6:
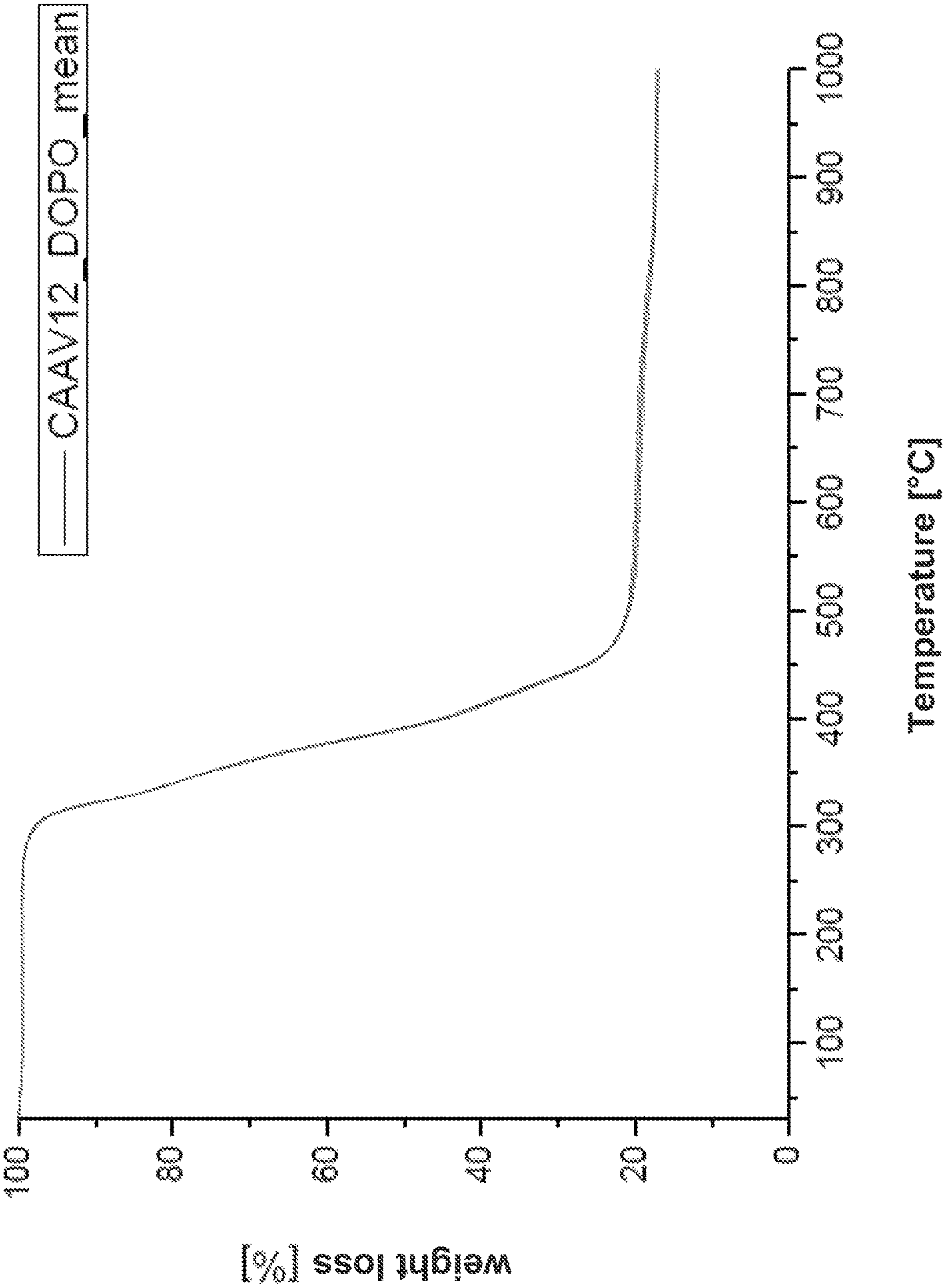
FIG. 6 depicts a TGA curve of the product, measured three times, wherein the crude product was boiled twice with acetonitrile and then dried in a fine vacuum, wherein the temperature was raised to 135° C., and 12 g of the DOPO-functionalized cellulose ester were obtained. Thermal analysis showed an onset of decomposition of approx. 300° C.

The crude product was boiled twice with acetonitrile and then dried in a fine vacuum, wherein the temperature was raised to 135° C. 12 g of the DOPO-functionalized cellulose ester were obtained, the thermal analysis of which showed an onset of decomposition of approx. 300° C. (see TGA curve in FIG. 6, measured three times).

EXAMPLE 12

Synthesis of a Phosphorus-Containing Cellulose Ester from the Cellulose Acrylate Acetate Propionate of Example 9 and Phosphorylated Anhydroerythritol (PAHE)

2 g of PAHE was dissolved in 8 ml of dry acetonitrile in a flask filled with nitrogen.

In a 100 ml Schlenk flask equipped with a heavy stirrer core, the opening was closed with a septum and this was connected to the Schlenk line. A vacuum was then applied with the aid of a rotary vane pump and the flask was heated with a hot air blower to remove traces of moisture and then the flask was filled with nitrogen. This process was repeated three times before 1 g of the cellulose-acrylate-acetate-propionate from Example 9 and 10 mg of phenothiazine were added to the flask in a nitrogen countercurrent. The flask was then closed again and vacuum was again applied and then filled with nitrogen. 12 ml of acetonitrile and 1.3 ml of triethylamine were then passed through the septum and this mixture was heated to 70° C. with vigorous stirring and under nitrogen with the aid of an oil bath and a magnetic heating stirrer. As soon as the oil bath had reached 70° C., 4.12 g of the previously prepared PAHE solution was added through the septum with a syringe and a cannula over the course of 40 minutes. The oil bath temperature was increased to 78° C. after the complete mixture was added. The reaction mixture remained under these conditions for 4.5 h. The oil bath was then removed and the mixture was stored at room temperature for 12 h.

Figure 7:
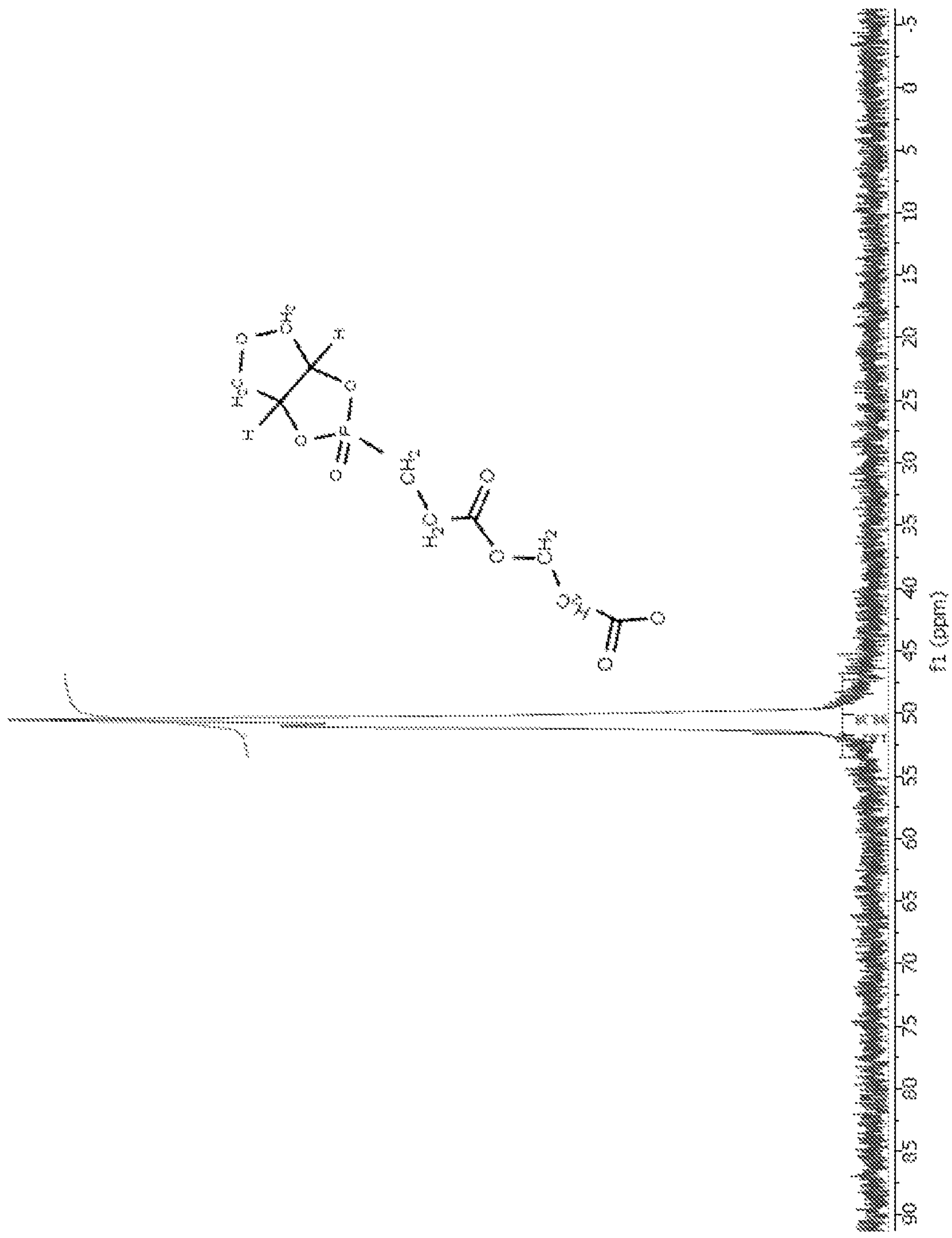
FIG. 7 depicts the $^{31}$P-NMR spectrum of the phosphorus-containing cellulose ester.
Figure 8:
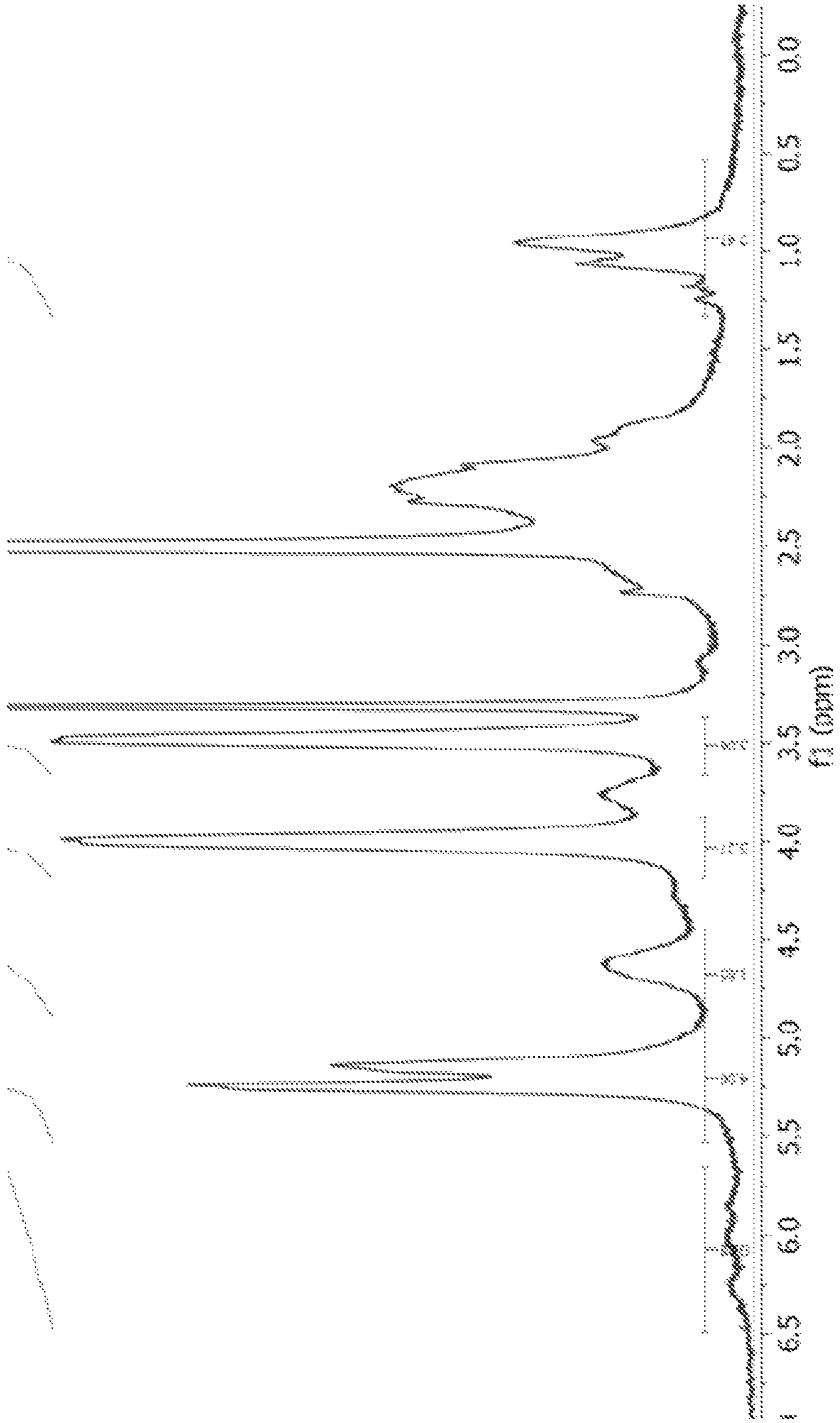
FIG. 8 depicts the $^{1}$H-NMR spectrum of the phosphorus-containing cellulose ester, which showed a very good purity.

Some of the volatile constituents were then distilled into a cold trap (approx. 10 ml) and warmed slightly in the process. After the reaction mixture had cooled somewhat, it was carefully (together with the solid that had formed during the reaction) placed in a nitrogen countercurrent and with vigorous stirring in a Schlenk flask filled with 25 ml of toluene (this was heated to 50° C. by means of an oil bath). A brown solid precipitated out. The solvent standing above the solid was then decanted and the solid was redissolved in 4 ml of acetonitrile. After it had dissolved, the mixture was carefully placed in a nitrogen countercurrent and with vigorous stirring in a Schlenk flask filled with 25 ml of toluene (this was heated to 50° C. by means of an oil bath). The solvent standing above the solid was then decanted off. This process was repeated one more time. The product was dried in a fine vacuum for 4 h, gradually warming to 155° C. The product was obtained as a white powder. The $^{31}$P-NMR spectrum (FIG. 7) of said phosphorus-containing cellulose ester and its 1H-NMR spectrum (FIG. 8) showed a very good purity. The thermal analysis showed an onset of decomposition at approx. 275° C.

EXAMPLE 13

Flame Retardancy Tests:

The PAHE-functionalized cellulose ester obtained in Example 10 and the DOPO-functionalized cellulose ester obtained in Example 11 were incorporated into polyamide 11 (from Sigma-Aldrich) and into the partially bio-based polyamide RX 2298 (product from BASF SE) by means of a microextruder. The extrusion temperature was 220° C. in both cases. UL94-V fire rods (1.6 mm) were injection molded from the granules thus obtained and the test rods were subjected to a fire test in accordance with DIN EN 60695-11-10. For comparison, test specimens free of flame retardants of the same dimensions were produced and examined in the same way. When using the PAHE-functionalized cellulose ester, the flame retardant concentration (loading) was 18% by mass and when using the DOPO-functionalized cellulose ester, was 20% by mass.

In addition, the DOPO-functionalized celluene ester was incorporated into polyethylene terephthalate (BISNEINEX; product from Equipolymers) in an analogous manner (extrusion temperature 260° C.).

Before the extrusion process, the polymer granules were comminuted with a Retsch cryomill. The polymer granules were ground under cryogenic temperatures for 5-10 minutes at a frequency of 30 Hz. A HAAKE MiniLab II small extruder from Thermo Scientific was used for the extrusion. The HAAKE MiniJet PRO from Thermo Scientific was used to produce the UL94 test specimens. The Atlas HVUL2 fire chamber was used to determine the fire resistance.

The flame retardant additives and the polymer powders obtained after grinding were dried in a vacuum before the extrusion process.

The UL94-V tests yielded the following results:

| Polymer | Additive | Additive concentration (mass %) | Burn time 1st and 2nd Flaming(s) | Burning drips | UL94-V classification |
|---|---|---|---|---|---|
| RX 2298 | — | — | 1. 2-9<br>2. 4-11 | Yes | V2 |
| RX 2298 | E.g. 8 | 18 | 1. ≤ 0.5<br>2. ≤ 0.5 | No | V0 |
| RX 2298 | E.g. 10 | 20 | 1. ≤ 1.0<br>2. ≤ 1.0 | Yes | V2 |
| PA 11 | — | — | 1. 1-3<br>2. 2-3 | Yes | V2 |
| PA 11 | E.g. 10 | 20 | 1. ≤ 0.5<br>2. ≤ 0.5 | No | V0 |
| PET | — | — | 1. 2-3<br>2. 3-4 | Yes | V2 |
| PET | E.g. 10 | 10 | 1. ≤ 0.5<br>2. ≤ 0.5 | No | V0 |

These tests show a good flame retardant effect of the flame retardant additives according to the invention. The best possible flame retardant classification V0 was achieved in all three polymers.

The invention claimed is:

1. A cellulose derivative of the general Formula I

Formula I

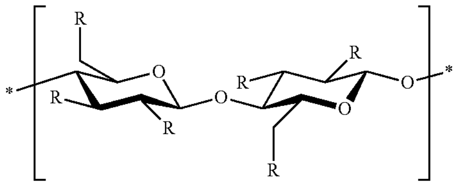

wherein

R is the same or different on each occurrence and is selected from the group consisting of hydroxyl groups, moieties of the general formula II, and moieties of the general formula III Formula II

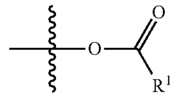

Formula III

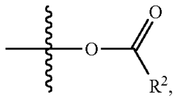

wherein $R^1$ is identical or different on each occurrence and is of the formula IV:

Formula IV

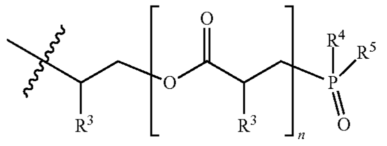

wherein $R^3$, $R^4$, $R^5$, and n are the same or different at each occurrence, $R^3$ is selected from the group consisting of hydrogen or linear or branched alkyl moieties having 1 to 36 carbon atoms, and $R^4$ and $R^5$ are independently selected from the group consisting of alkyl moieties, aryl moieties, alkyl aryl moieties, arylalkyl moieties, O-alkyl moieties, O-aryl moieties, O-alkyl aryl moieties, N-alkyl moieties, N-aryl moieties, N-arylalkyl moieties, and N-alkyl aryl moieties, wherein $R^4$ and $R^5$ and the phosphorus atom can also be part of heterocyclic ring systems, which can be single or multi-membered, and wherein the heterocyclic ring system is selected from the group consisting of the following moieties:

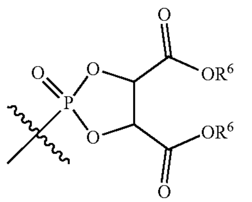

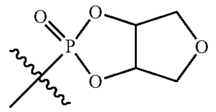

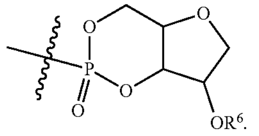

wherein $R^6$ is independently selected from the group consisting of alkyl moieties, aryl moieties, alkyl aryl moieties, arylalkyl moieties, O-alkyl moieties, O-aryl moieties, O-alkyl aryl moieties, N-alkyl moieties, N-aryl moieties, N-arylalkyl moieties, and N-alkyl aryl moieties;

and n is 0 or an integer from 1 to 3, and $R^2$ is identical or different on each occurrence and is selected from the group consisting of linear or branched alkyl moieties having 1 to 36 carbon atoms and linear or branched arylalkyl moieties having 7 to 36 carbon atoms, with the proviso that in formula I, at least one R is a moiety according to formula II.

2. The cellulose derivative according to claim 1, wherein $R^2$ is identical or different on each occurrence and is selected from the group consisting of linear or branched alkyl moieties having 1 to 12 carbon atoms and linear or branched arylalkyl moieties having 7 to 14 carbon atoms.

3. The cellulose derivative according to claim 1, wherein, based on all moieties R, the molar proportion of the moieties according to formula II is 40 to 90 mol %, of the moieties according to formula III, is 10 to 90 mol %, and/or the hydroxyl groups is a maximum of 50 mol %.

4. A method of imparting flame retardancy to a plastic material comprising incorporating into the plastic material an effective amount of a cellulose derivative of general formula I according to claim 1.

5. The method of claim 4, wherein the plastic material is a thermoplastic material.

6. The method of claim 4, wherein the plastic material is selected from the group consisting of a polyester, a polyamide, a polyolefin, a polycarbonate, PMMA, polystyrene, styrene block polymer, a cellulose ester, a polyurethane, and an epoxy resin, each of which is unfilled, filled, or reinforced.

7. A flame retardant composition comprising at least one cellulose derivative of the general formula I according to claim 1 and at least one further flame retardant differing from the cellulose derivative of the general formula I.

8. The flame retardant composition according to claim 7, wherein the at least one further flame retardant differing from the cellulose derivative of the general formula I is selected from the group consisting of metal hydroxides, melamine derivatives, nitrogen bases, phosphates, phosphonates, phosphinates, pyrophosphates, polyphosphates, siloxanes, and pentaerythritol.

9. The flame retardant composition according to claim 7, wherein the at least one further flame retardant differing from the cellulose derivative of the general formula I is selected from the group consisting of magnesium hydroxide, aluminum hydroxide, boehmite, melamine polyphosphate, ammonium polyphosphate, melamine cyanurate, zinc pyrophosphate, piperazine pyrophosphate, piperazine polyphosphate, and 1,3,5-tris(2-hydroxyethyl)isocyanurate.

10. A plastic composition comprising of at least one plastic material and at least one cellulose derivative of the general formula I according to claim 1, wherein the at least one cellulose derivative of the general formula I is added in a flame retardancy effective amount.

* * * * *